United States Patent [19]

Sakagami et al.

[11] Patent Number: 5,134,324
[45] Date of Patent: Jul. 28, 1992

[54] MOVING MAGNET TYPE LINEAR MOTOR FOR AUTOMATIC DOOR

[75] Inventors: Shigeru Sakagami, Nagoya; Yoshiaki Nagasawa, Toyota, both of Japan

[73] Assignee: Toyota Shatai Kabushiki Kaisha, Kariya, Japan

[21] Appl. No.: 626,764

[22] Filed: Dec. 13, 1990

[30] Foreign Application Priority Data

Dec. 19, 1989 [JP] Japan .................. 1-146418[U]

[51] Int. Cl.⁵ .......................................... H02K 41/00
[52] U.S. Cl. .................................... 310/12; 318/135; 104/281; 310/105
[58] Field of Search .............. 310/12, 13, 14, 105, 310/51; 49/404; 160/1, DIG. 17, 15, 18, 212; 318/135; 104/121, 281, 283, 94, 93

[56] References Cited

U.S. PATENT DOCUMENTS

| | | | |
|---|---|---|---|
| 3,426,887 | 2/1969 | Ward et al. | 310/12 |
| 4,185,836 | 1/1980 | Taylor et al. | 310/12 |
| 4,318,038 | 3/1982 | Munehiro | 318/13 J |
| 4,324,185 | 4/1982 | Vinson | 104/283 |
| 4,545,117 | 10/1985 | Okamoto | 29/596 |
| 4,641,065 | 2/1987 | Shibuki et al. | 318/13 J |

FOREIGN PATENT DOCUMENTS

| | | |
|---|---|---|
| 2151907 | 11/1972 | Fed. Rep. of Germany . |
| 2068155 | 8/1971 | France . |
| 55-83454 | 6/1980 | Japan . |
| 57-113767 | 7/1982 | Japan . |
| 970584 | 4/1981 | U.S.S.R. . |

Primary Examiner—Steven L. Stephan
Assistant Examiner—Ed To
Attorney, Agent, or Firm—Burns, Doane, Swecker & Mathis

[57] ABSTRACT

In a moving magnet type linear motor for automatic door of the invention, a stator fixed inside a guide rail having a substantially ∩-shaped cross section and a moving unit having a substantially U-shaped cross section are combined so that a height of the linear motor can be the same as that of the guide rail and the moving unit is supported slidably relative to the guide rail and fixing members of the stator has at least the both longitudinal ends or the stroke ends formed of non-magnetic conductive materials in order that the moving magnet type linear motor for automatic door produces only a low sound and is durable.

11 Claims, 6 Drawing Sheets

MOVING MAGNET TYPE LINEAR MOTOR FOR AUTOMATIC DOOR

BACKGROUND OF THE INVENTION

The present invention relates to a moving magnet type linear motor for an automatic door.

In order to open and close an automatic door, a rotating motor is mainly employed for a power source, a decelerator controls an output of the rotating motor and a interlocking mechanism such as a belt and a chain transmits the controlled output to the door. In this case, a problem of external appearance arises in that a cross section of a rail cannot be made small because of the sizes of the rotating motor, the decelerator and the interlocking mechanism. Also, a noise problem arises in that the decelerator and the chain produce a loud sound heard like a noise.

Meanwhile, though there is an automatic door opened and closed by a linear motor, a small enough linear motor for operating the automatic door has not been developed at present.

SUMMARY OF THE INVENTION

In view of the foregoing, it is an object of the present invention to provide a moving magnet type linear motor for an automatic door which produces little noise and has high durability.

The object of the present invention is accomplished by providing the moving magnet type linear motor for an automatic door with a guide rail opening a lower face thereof to have a substantially ∩-shaped cross section, a stator having a plurality of flat coils arranged in a longitudinal direction in a space of the guide rail and fixing members surrounding and fixing the flat coils in an upper portion of the guide rail, a moving unit having permanent magnets arranged in mutually facing inner sides of a yoke with a substantially U-shaped cross section so as to form a magnetic circuit so that the permanent magnets are placed between both sides of the stator, a support assembly which supports the moving unit in such a manner as to be slidable relative to the guide rail so that the moving unit moves along the stator, and the fixing members having at least both longitudinal ends or stroke ends formed of non-magnetic conductive materials.

In accordance with the above structure of the moving magnet type linear motor for an automatic door, a stator fixed inside the guide rail opens to the lower face thereof so as to have the substantially ∩-shaped cross section and the moving unit having the permanent magnets arranged in the mutually facing inner sides of the yoke with the substantially U-shaped cross section are combined with each other so that the permanent magnets of the moving unit are placed between the both sides of the stator. Therefore, a height of the linear motor can be minimized. Also, a width of the linear motor can be made small because the coils of the stator are the flat coils. Further, the moving unit is supported slidably relative to the guide rail to be movable along the stator, therefore a noise can be reduced, which results in a quiet operation. In addition, the fixing members of the stator has at least both longitudinal ends or stroke ends formed of the non-magnetic conductive materials, therefore a magnetic field of the permanent magnet of the moving unit generates an eddy current in the fixing members to produce a braking operation, thereby lessening the shock when the moving unit stops at the stroke ends and increasing the durability of the linear motor.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

An embodiment of the present invention is described in accordance with the accompanying drawings.

Figure 1:
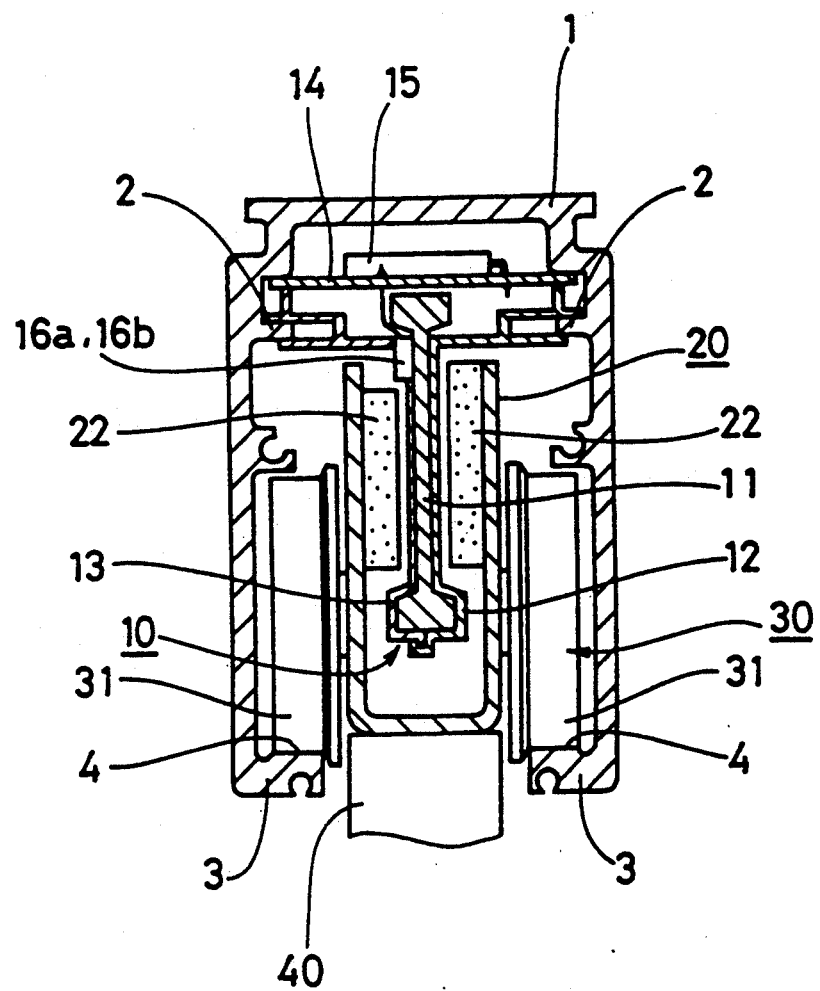
FIG. 1 is a cross sectional view of a linear motor.

As illustrated in a cross sectional view of FIG. 1, a moving magnet type linear motor for an automatic door is composed by arranging a stator 10, a moving unit 20 and a support assembly 30 of the moving unit 20 inside a guide rail 1 having a cross section of a substantially inverted U shape.

The guide rail 1 is a shape material of aluminium or the like and has a cross section of a substantially inverted U shape, that is, the guide rail 1 is so shaped as to open to the lower side thereof. The guide rail 1 is formed integral with support projections 2 inside an upper portion thereof and with roller-supporting portions 3 on a lower end thereof. Tracks 4 are formed in the roller-supporting portions 3.

Figure 2:
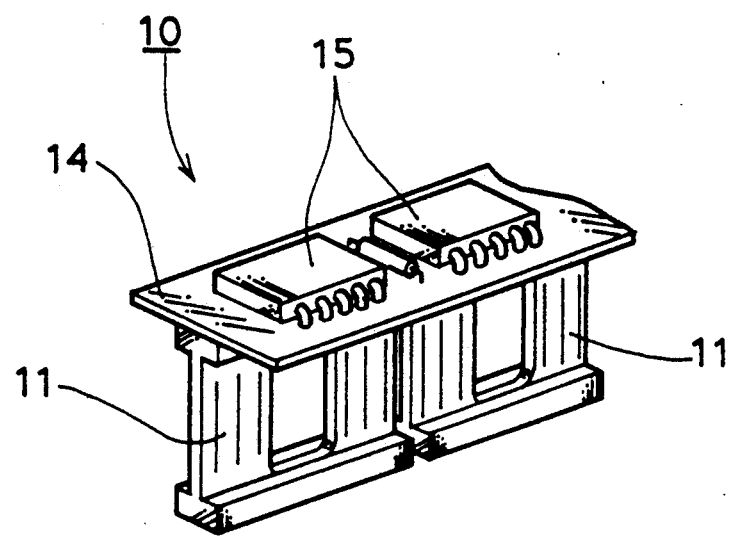
FIG. 2 is a partial perspective view of a stator.

As illustrated in FIG. 2, the stator 10 is constituted by lining flat coils of the number corresponding to a length of the guide rail 1 to have a size as described below (see FIG. 4). As illustrated in FIG. 1, the flat coil 11 is sealed, surrounded, and held by fixing members 12 and 13 made of the shape material such as aluminium, respectively. A circuit board 14 is provided horizontally on an upper end of the flat coil 11. The stator 10 is overall formed into a T-letter shape.

Electronic control circuits 15 are arranged on circuit board 14 at each flat coil 11 and are connected with the circuit board 14 in a predetermined manner. A set of hall elements 16a and 16b are placed in each flat coil 11 according to the size as illustrated in FIG. 4. The stator 10 constructed as above is positioned in the space in the guide rail 1 and upper ends of the fixing members 12 and 13 are supported by the support projections 2, 2, so that the lined flat coils 11 are positioned in a center of the space of the guide rail 1.

Figure 3:
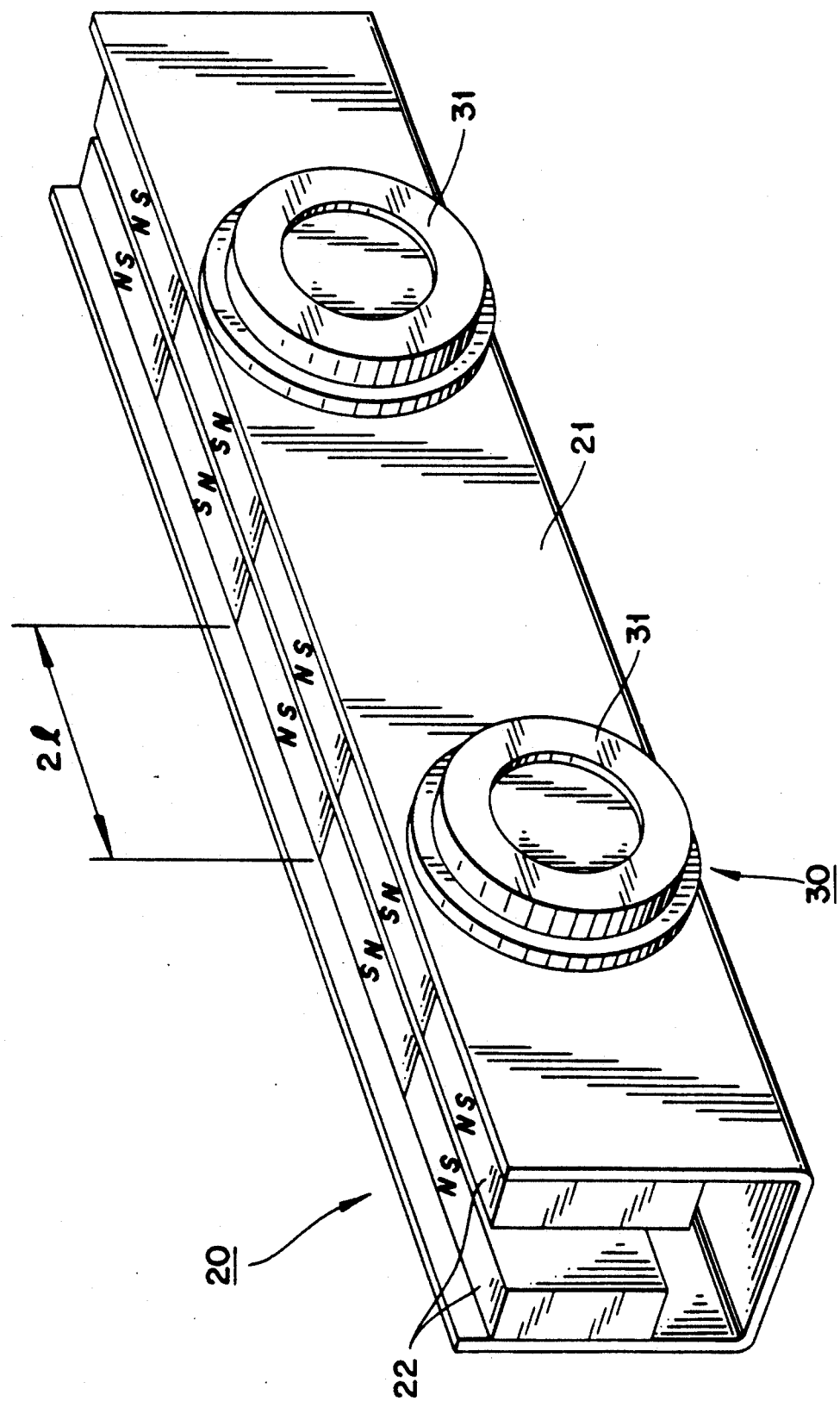
FIG. 3 is a perspective view of a moving unit.

As illustrated in FIG. 3, in the moving unit 20, a yoke whose cross section is substantially U-shaped serves as a moving unit body 21 and a plurality of permanent magnets 22, 22 with an isometric length (2 1) are arranged in a longitudinal direction to constitute a magnetic circuit, and moreover their polarities are inverted between adjacent and opposite magnets to each other. In consequence, an uniform magnetic field is formed between the permanent magnets 22, 22 facing each other. Rollers 31 are attached to both outsides of the moving unit body 21 to form a support assembly 30 of the moving unit 20. The moving unit 20 constructed as above is inserted in the guide rail 1 so that the rollers 31 are supported by the tracks 4, 4 of the roller-supporting portions 3, 3 formed at lower ends of the guide rail 1. Thereby, the flat coils 11 of the stator 10 are positioned at a gap between the permanent magnets 22, 22. A door is fixed on a lower face of the moving unit body 21. The number of the permanent magnet 22 arranged in the moving unit 20 is determined according to a required thrust.

In case that the fixing members 12 and 13 are formed of non-magnetic conductive materials such as aluminium, on eddy current generates in the fixing members 12 and 13, accompanied by movement of the moving unit 20 so that a braking operation is generated in the moving unit 20. As a result thereof, the moving unit 20 can be decelerated, allowing the maintenance of safety as an automatic door. Further, the fixing members 12 and 13 of both stroke end portions in a longitudinal direction of the guide rail 1 are formed of non-magnetic conductive material, so that shock can be reduced when the moving unit 20 stops at both ends of the guide rail 1.

The above-mentioned braking operation be regulated by means of changing a conductivity of the non-magnetic conductive material, areas in which the braking operation generates and positions in which the braking operation starts generating. In case that the door is opened manually, an initial velocity is 0. Therefore, the braking operation does not generate, so that the door start moving smoothly.

Figure 4:
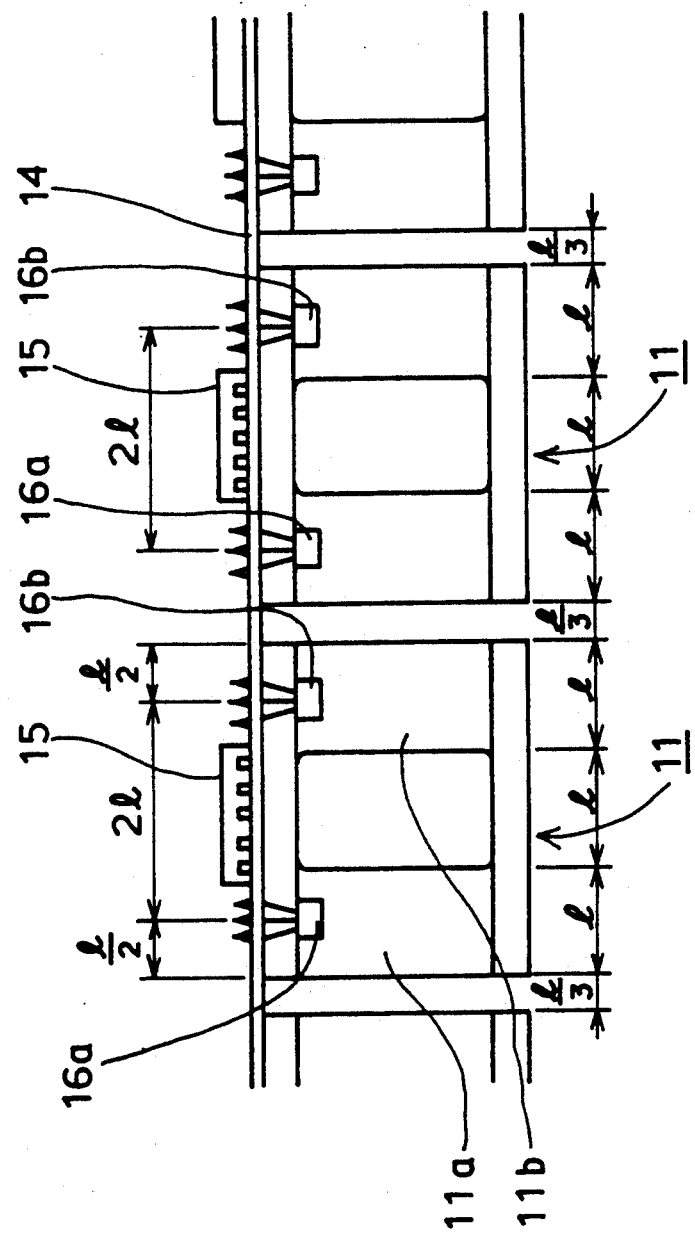
FIG. 4 is an explanatory view showing size and position relationships of flat coils and position relationships of hall elements.

FIG. 4 illustrate the size and positioned relationships of the flat coils 11 and the positioned relationships of the hall elements 16a and 16b in the case of magnetic pole pitches 2 l of the permanent magnets arranged in the moving unit 20.

Each flat coil 11 has an overall length of 3 l, including a coil winding portion 11a and 11b with a length of l on a right and left thereof, respectively and a space with a length of l at a center thereof. The flat coils 11 are arranged with an interval of l/3 from each other. The hall elements 16a and 16b are arranged at the centers of the coil winding portions 11a and 11b with an interval of 2 l relative to each other.

Figure 5:
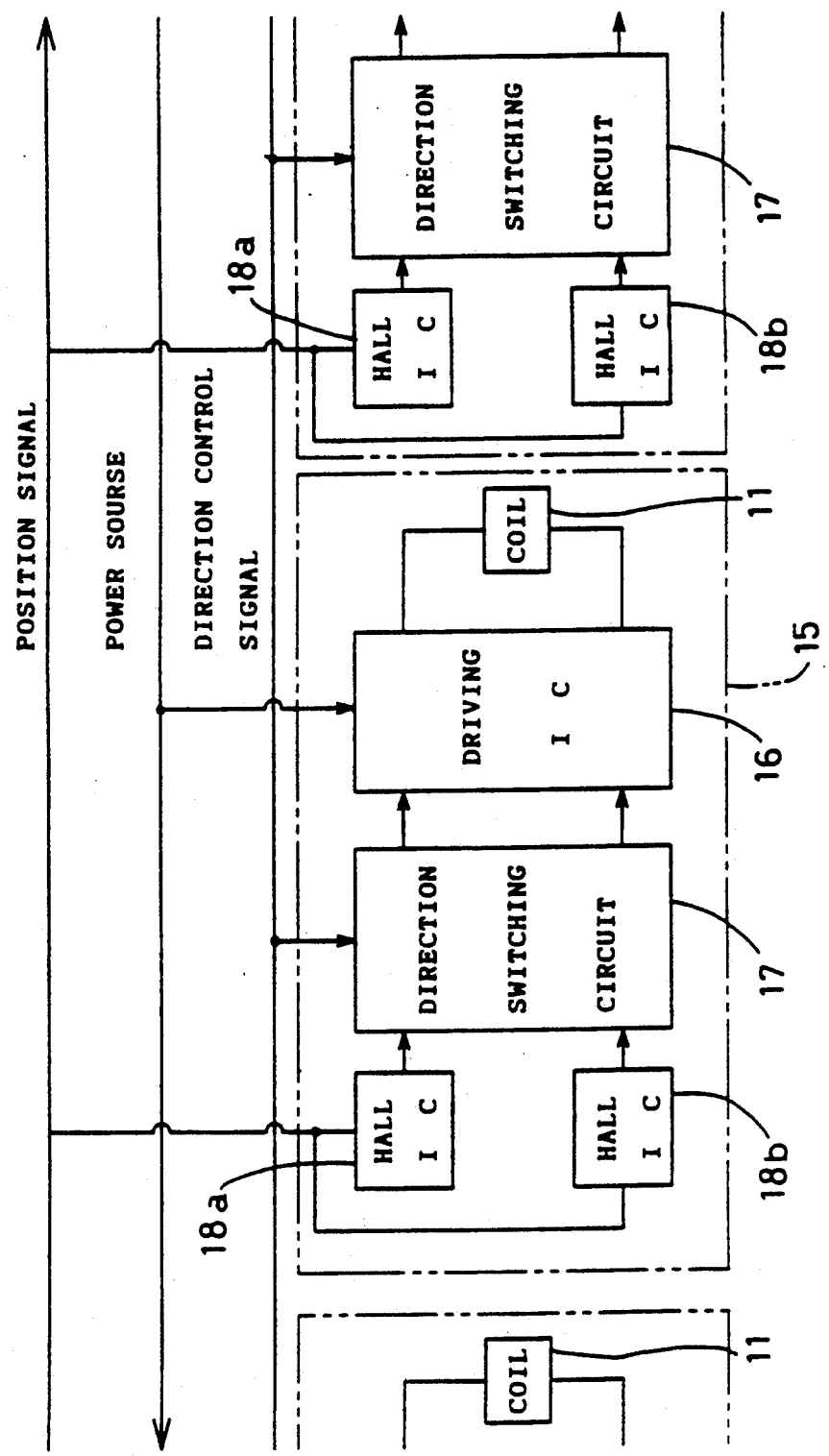
FIG. 5 is a schematic block diagram of an electronic control circuit.

FIG. 5 illustrates the electronic control circuit 15.

A driving IC 16 is connected with each flat coil 11 to send current to the flat coil 11 in accordance with signals of a direction switching circuit 17 which switches the direction of current sent to the flat coil 11.

The directions switching circuit 17 is connected with hall IC units 18a and 18b which amplify and output detection signals of the hall elements 16a and 16b of magnetic detection elements. The hall IC 18a and 18b detect the magnetism of the permanent magnets 22 of the moving unit 20 and outputs signal to the direction switching circuit 17. Then, In accordance with the signal outputted to the direction switching circuit 17, the direction switching circuit 17 outputs a signal to the driving IC 16 and the driving IC sends current to the coil 11 in accordance with polarities of the permanent magnet 22 so that the moving unit 20 moves in a predetermined direction.

A driving direction of the driving IC is switched by outputting direction control signals to the direction switching circuit 17. The signals of the hall IC 18a and 18b can be utilized as position signals. A power circuit (not shown) supplies power to the driving IC 16.

Figure 6:
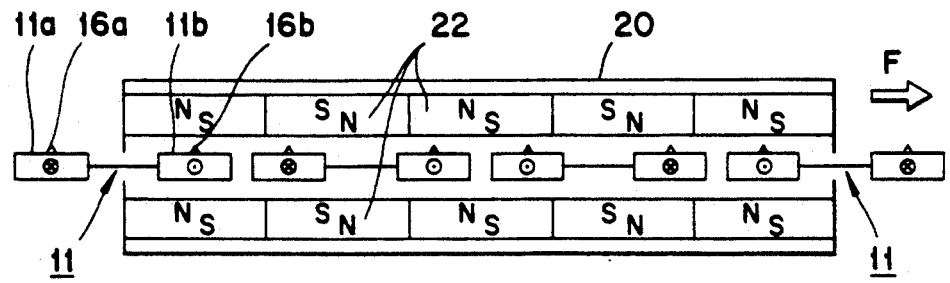
FIGS. 6(1)-6(5) are explanatory views showing typical actuation of the linear motor.
Figure 6:
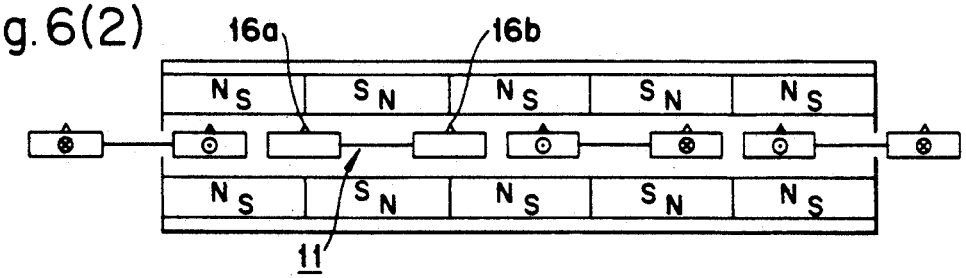
Figure 6:
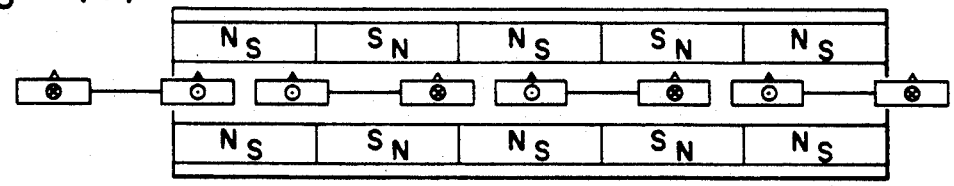
Figure 6:
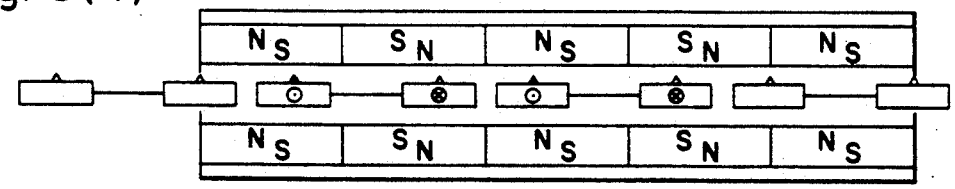
Figure 6:
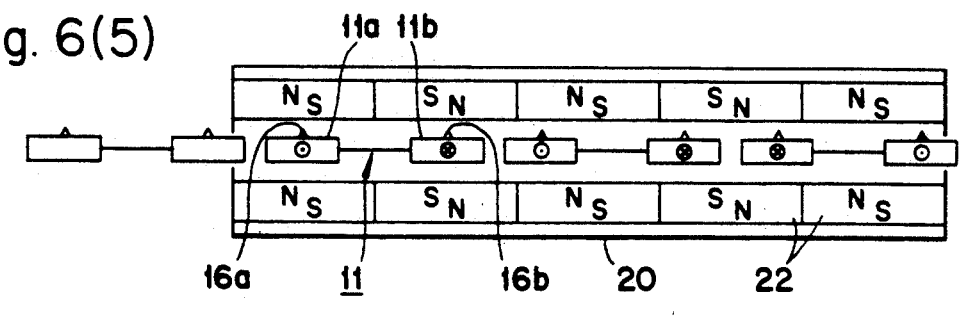

Referring to FIG. 6, there is shown an actuation of the moving magnet type linear motor for an automatic door having the aforementioned structure.

FIG. 6 (1) to FIG. 6 (5) typically show states in which the direction switching circuit 17 controls switching of a direction of the current supplied to the each flat coil 11 of the stator 10 in accordance with the position signal of the hall elements 16a and 16b detecting the magnetism of the permanent magnet 22, 22 arranged in the moving unit 20, so that the moving unit 20 receives the thrust according to Flemming's left-hand rule to move in the right.

In FIG. 6(1) to FIG. 6(5), the current direction is represented in the following manner: -current up; -current down, and the Hall element is represented in the following manner: ▲-output of position signal; △-non-output of position signal.

In FIG. 6 (1), in case that magnetic fields shown in the first, the third and the fifth magnetic circuit from the left, of the magnetic circuits constituted by the permanent magnets 22, 22 of the moving unit 20, acts, the direction switching circuit 17 switches the direction of the current supplied to the flat coil 11, based on the position signal which the hall element 16a or 16b outputs.

The current is supplied to the flat coil 11 in a direction in which the current flowing to the coil winding portion 11a or 11b of the flat coil 11 to which the hall element 16a or 16b outputs the position signal flows from the current down direction to the current up direction. The hall element 16a or 16b outputting the position signal is shown by a mark ▲. In this case, the moving unit 20 receives the thrust F generating for the right according to the Flemming's left-hand rule.

In FIG. 6 (2), in case that the hall elements 16a and 16b of the second flat coil 11 from the left just approach switching points of the permanent magnets 22, 22, a strength of the magnetic field is 0, so that the hall elements 16a and 16b do not output the position signals. As a result thereof, the current is not supplied to the flat coil 11.

In FIG. 6 (3) to FIG. 6 (5), as mentioned above, the thrust F can be adapted to act in the right on the moving unit 20 by switching the direction of the current flowing to the flat coil 11 corresponding to the permanent magnet 22 of the moving unit 20.

Also, the moving unit 20 can be moved in the left by supplying the reverse current of the aforementioned direction to the flat coil 11, based on the position signal which the hall elements 16a and 16b output as shown by the mark▲output.

The moving unit 20 can be stopped smoothly at the end of the stroke, cooperating with the braking operation of the eddy current generating in the fixing members 13 and 14 formed of the aforementioned non-magnetic conductive material by supplying the reverse current to the flat coils 11 of the stroke ends The aforesaid embodiment is described in respect of the moving magnet type linear motor for automatic door. However, it is to be understood that the linear motor of the present invention can be employed for a power source in case that an article or the like is carried between predetermined positions.

In accordance with the above structure of the moving magnet type linear motor for an automatic door, a stator fixed inside the guide rail having the substantially ∩-shaped cross section and the moving unit having the substantially U-shaped cross section are combined, so that a height of the linear motor can be the same as that of the guide rail. Further, the moving unit is supported slidably relative to the guide rail, therefore noise can be reduced, which results in a quiet operation. In addition, the fixing members of the stator have at least the both longitudinal ends or the stroke ends formed of the non-magnetic conductive materials, therefore a magnetic field of the permanent magnet of the moving unit generates an eddy current in the fixing members to produce a braking operation, thereby lessening a shock when a moving unit stops at the stroke ends and increasing the durability of the linear motor.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A moving magnet type linear motor useful for operating an automatic door, comprising:
   a guide rail having an interior and an open end;
   a stator having a plurality of coils arranged in a longitudinal direction within the interior of the guide rail, said stator having fixing members which substantially surround and fix the coils within the interior of the guide rail;
   a moving unit including a yoke, said moving unit including permanent magnets positioned on mutually facing inner sides of the yoke to form a magnetic circuit and said stator being positioned between the permanent magnets;
   a support assembly for slidably supporting the moving unit relative to the guide rail so that the moving unit is able to move longitudinally with respect to the stator and longitudinally along the guide rail between oppositely positioned stroke ends, said fixing members being formed of non-magnetic material adjacent at least one of the stroke ends of the guide rail to thereby produce a braking force for reducing shock when the moving unit stops at said at least one stroke end.

2. The linear motor according to claim 1, including support projections integrally formed with the guide rail at the upper portion thereof, said support assembly including roller-supporting portions integrally formed with the guide rail adjacent the lower end thereof, said roller-supporting portions defining tracks and said guide rail being fabricated from aluminum.

3. The linear motor according to claim 1, wherein said stator is generally T-shaped in cross-section and said fixing members which seal and surround the flat coils being fabricated from aluminum, said stator being supported within the guide rail by support projections forming a part of the guide rail.

4. The linear motor according to claim 1, wherein each of said flat coils includes two coil winding portions separated by a space, the length of each coil winding portion in the longitudinal direction being approximately equal and the length of the space between the two coil winding portions in the longitudinal direction being approximately equal to the length of each coil winding portion, and adjacent flat coils being spaced apart from one another in the longitudinal direction by a distance approximately equal to one third the length of each coil winding portion.

5. The linear motor according to claim 1, wherein said permanent magnets have a length in the longitudinal direction approximately equal to twice the length of each of the coil winding portions, said permanent magnets being arranged such that adjacent magnets on the same inner side of the yoke and facing magnets on opposite inner sides of the yoke have polarities that are inverted with respect to one another.

6. The linear motor according to claim 1, wherein said support assembly includes rollers attached to opposite outer surfaces of the yoke, said rollers being adapted to roll along tracks forming a part of the guide rail.

7. The linear motor according to claim 1, including a door positioned on a lower end face of the moving unit.

8. The linear motor according to claim 1, wherein said guide rail has a substantially ∩-shaped cross-section so that the open end of the guide rail is a lower end of the guide rail.

9. The linear motor according to claim 1, wherein said coils are flat and said fixing members fix the flat coils within an upper portion of the guide rail.

10. The linear motor according to claim 1, wherein said moving unit has a substantially U-shaped cross section so as to define an open upper end.

11. The linear motor according to claim 1, wherein the fixing members are formed of non-magnetic material adjacent both stroke ends of the guide rail.

* * * * *